WILLIAM H. LANSING.
Improvement in Whirligigs.
No. 127,174. Patented May 28, 1872.
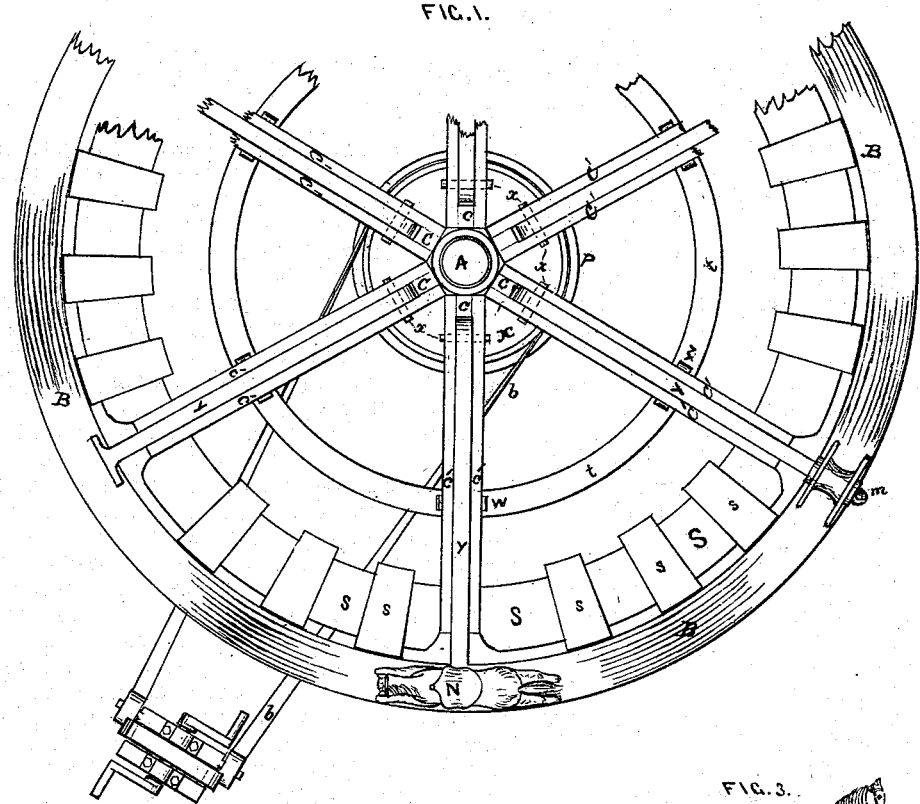
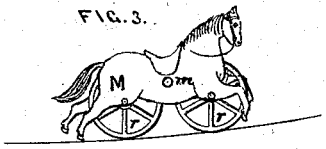
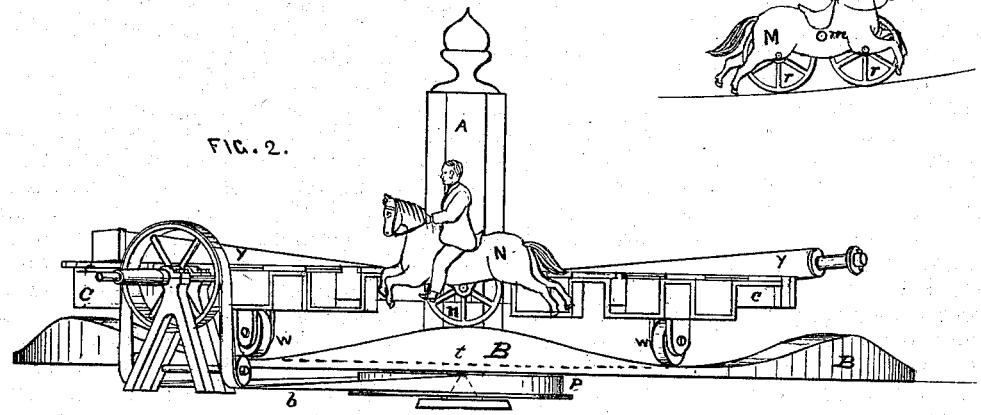

UNITED STATES PATENT OFFICE.

WILLIAM H. LANSING, OF TROY, NEW YORK.

IMPROVEMENT IN WHIRLIGIGS.

Specification forming part of Letters Patent No. 127,174, dated May 28, 1872.

Specification describing certain Improvements in Whirligigs, invented by WILLIAM H. LANSING, of Troy, in the county of Rensselaer, State of New York.

My invention relates to improvements in whirligigs, by which title I wish to designate machines in common use at fairs and other popular gatherings for purposes of amusement. The first part of my invention relates to the construction of the machine whereby it is rendered far less cumbersome and a great deal stronger than machines of a similar character have hitherto been, besides being better adapted to be taken apart for purposes of transportation. The second part of my invention relates to the means I use to produce an imitation of the natural movement of the animals or vehicles of the machine.

Figure 1 is a plan of a machine embodying my improvement. Fig. 2 is an elevation of the same. Fig. 3 is a representation in detail of a part of the machine.

Upon the vertical shaft A, which is driven by the pulley P and belt $b$ $b$, by any available power, is securely fastened a cross, C C, each arm of which is composed of two parallel pieces of timber, C' C' C' C', Fig. 1. In practice a metal spider would be provided, of suitable dimensions and strength, and having as many faces as the machine is to have arms. In the drawing but six arms are shown, but in practice a greater number is contemplated. This spider or hub would be made with three recesses in each face, in the two outside ones of which the beams C' C' C' C' would be bolted. The number of these radiating arms is not limited; but it is necessary that they should be diametrically opposed to one another, so that opposite pairs form diameters of the circle of which they are the radiuses. Wheels $w$ $w$, Figs. 1 and 2, are placed under said arms toward their outside ends, which run upon a level circular track, $t$, Fig. 1, shown by the dotted line $t$, Fig. 2, when the pulley P revolves, effectually supporting any reasonable load that may be placed upon them. The outer ends of these arms or beams are connected by segments S S of wood or any other suitable material, on which are placed seats for the accommodation of a greater number of riders than the ends of the arms can carry. This track $t$ may be laid on and supported by the beams of the frame supporting the bearings of the center pulley-shaft A; or it may be laid on independent ties, or in any other way, provided that it be a circle of which the pulley A P is the center, and that it be perfectly level.

This mode of construction does away with the lofty central shaft and its necessary supports, and also with the clumsy guys which have hitherto supported the arms of machines of this character.

The wheels $w$ $w$, running on the track $t$, are capable of carrying a very heavy load with very little friction; and for purposes of transportation its advantages are manifest, there being no single piece which two men cannot easily handle. A much greater diameter can be given to a machine made on this principle than will be found practicable where all is, as it were, hung from the central shaft, while the absolute necessity of disposing the riders so as to balance one another does not exist.

Between the two pieces $c$ $c$, composing each arm of the machine, is pivoted on a stout pin, $x$ $x$ $x$, Fig. 1, another and longer beam, $y$ $y$, Figs. 1 and 2, on the end of which is placed the figure of an animal or a vehicle, N, Figs. 1 and 2, and M, Fig. 3, provided with a wheel, $n$, Fig. 2, or wheels $r$ $r$, Fig. 3, which run upon the track B B. This track is concentric with the last-described track, but, unlike it, is made undulating. The undulations are in the present case seven in number—four being shown by the shading on track B, Fig. 1, and three in perspective in Fig. 2, B B B. Their number may be increased indefinitely, provided, however, that each rise is diametrically subtended by a depression. The opposite arms being diameters of the circle of which the track B B is the circumference, it follows that as the end of one arm with its figure or vehicle is ascending a hill the opposite one is descending and forcing the pulley A to revolve as much as the other retards it, less the friction, thereby causing but a trifle more outlay of power than if the track were level.

The figures representing horses are furnished with two wheels, $r$ $r$, Fig. 3, and are pivoted on the end of the arms $y$ $y$ $y$. As they pass over the undulations of the track B B a prancing motion is imparted to them. There is no objection in extending this arrangement to the vehicles; or the horses may be furnished with only one wheel, as is the case in Fig. 2. There may be rubbing-irons attached in the usual way to the inside of the beams C' C' C' C', and projecting above them as high as the beams $y\ y\ y$ may rise, for the twofold purpose of saving the beams from wearing each other, and for steadying the central beams $y\ y\ y$.

Having thus described my invention, I make no claim to the figures or vehicles running around the center of a circle on a level track; nor do I claim the mode of pivoting the horse or vehicle on the end of a lever, for I am well aware that these movements are old; but I claim as my invention—

1. The combination of the central pulley or gear P and its shaft A with the arms C C C' C', wheels $w\ w$, and level track $t\ t\ t$, substantially as set forth.

2. The combination of the arms $y\ y\ y$ with figures N M, wheels $r\ r$ and $n$, and undulating track B B B, substantially as and for the purpose set forth.

3. The arrangement of undulations and arms, as described.

WILLIAM H. LANSING.

Witnesses:
R. R. GUFFRIES,
A. R. MOORE.